UNITED STATES PATENT OFFICE.

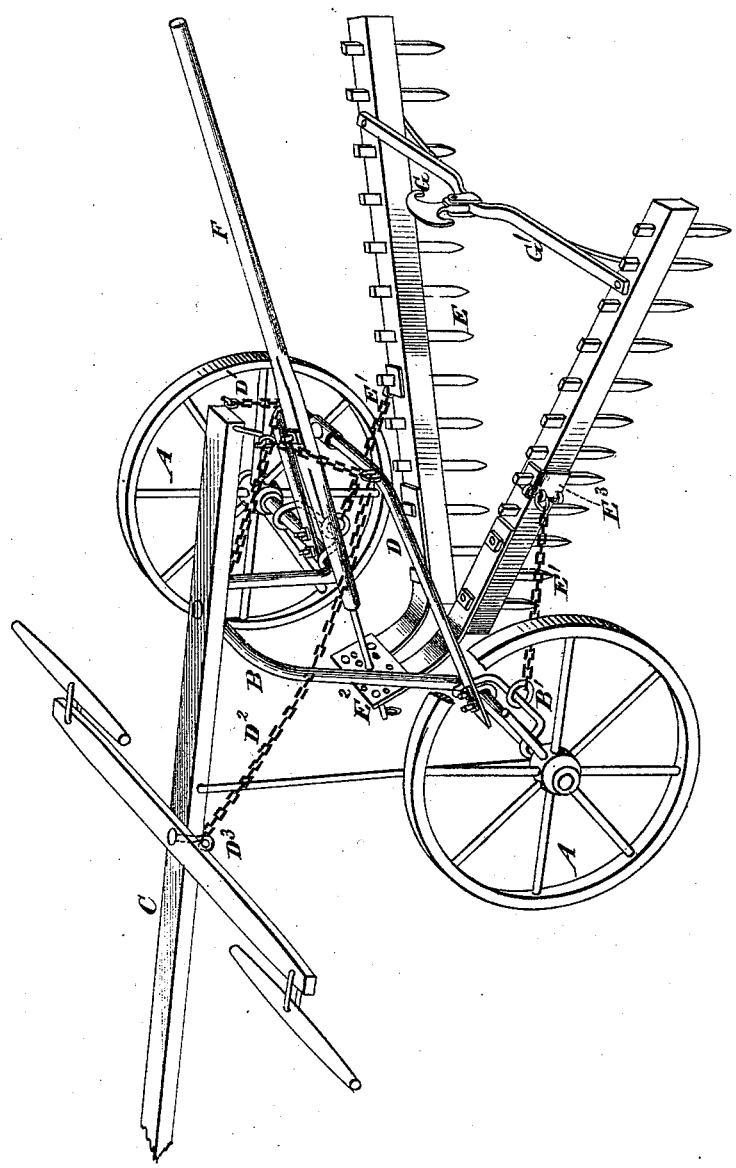

ELI MURRAY, OF RUSHVILLE, INDIANA.

IMPROVEMENT IN HARROWS.

Specification forming part of Letters Patent No. 212,043, dated February 4, 1879; application filed August 17, 1878.

*To all whom it may concern:*

Be it known that I, ELI MURRAY, of Rushville, in the county of Rush and State of Indiana, have invented new and useful Improvements in Harrows, of which the following is a specification:

In the annexed drawing, making a part of this specification, I have shown my improved harrow in single perspective view.

A A are wheels. B is an arched axle similar to that used in straddle-row cultivators. C is the tongue, and that part of a cultivator may be used for carrying the harrow attached in the following manner: D is a brace, attached to the horizontal portion of the axle by yokes and nuts, and sustained by the chain $D^1$, extending to the rear end of the tongue, and $D^2$, extending to the hook or bolt $D^3$, which fastens the double-tree to the tongue. E is the harrow suspended with its point under the axle. The harrow is drawn by the chains $E^1$. These chains are attached to the draw-bar B' by rings, and the attachment to the harrow is made adjustable by means of the hasp $E^3$, which is so constructed as to span the beam of the harrow, and perforated with holes, through which any tooth of the harrow may be inserted.

The rods B' are attached in a horizontal position to the axle of the carriage, and their length provides for a play of the draw-chains and a lateral movement of the harrow.

The wooden bars or beams of the harrow are attached together in their front end by means of plates attached to each and curved upward, upon which is bolted a plate, $E^2$, perforated with a hole for the reception of an iron rod extending from a lever, F. This lever F is for the purpose of suspending the harrow, and has its fulcrum on the middle of the brace-bar D. A double-hooked catch, G, is attached to the middle of the transverse brace-bar G', which connects the bars of the harrow near its rear end.

By forcing down the free end of the lever F the front end of the harrow will be raised, and by engaging the long arm or free end with the catch G the rear end of the harrow will also be suspended, and the harrow be thus held in suspension.

The plate $E^2$ has also a series of holes in it, through any of which the bolts attaching it to the curved plates may be inserted, by means of which the harrow-beams may be adjusted.

What I claim, and desire to secure by Letters Patent, is—

A harrow, in combination with a cultivator-frame, A B C, and the chains $E^1$ and $D^2$, the adjustable fastenings $E^3$, the staple B', the hook $D^3$, and the perforated adjustable plate $E^2$, for the purposes of attaching and suspending the harrow to the cultivator-frame, substantially as described.

In testimony that I claim the foregoing as my own I affix my signature in presence of two witnesses.

ELI MURRAY.

Witnesses:
CLAUDE CAMBERN,
ROBERT E. BROWN.